United States Patent [19]
Takagi

[11] 3,878,350
[45] Apr. 15, 1975

[54] MICROWAVE COOKING APPARATUS

[75] Inventor: Yutaka Takagi, Takarazuka, Japan

[73] Assignee: Sharp Kabushiki Kaisha, Osaka, Japan

[22] Filed: July 14, 1972

[21] Appl. No.: 272,007

[30] Foreign Application Priority Data
July 15, 1971  Japan.................. 46-62366

[52] U.S. Cl............................... 219/10.55 E
[51] Int. Cl. ............................... H05b 9/06
[58] Field of Search ........ 219/10.55, 553, 347, 352, 219/354, 464

[56] References Cited
UNITED STATES PATENTS

| | | | |
|---|---|---|---|
| 2,658,984 | 11/1953 | Mohn................................. | 219/347 |
| 3,081,392 | 3/1963 | Warner.............................. | 219/10.55 |
| 3,223,875 | 12/1965 | Eggers .............................. | 219/553 X |
| 3,320,396 | 5/1967 | Boehm.............................. | 219/10.55 |
| 3,348,026 | 10/1967 | Bassett.............................. | 219/464 X |
| 3,471,680 | 10/1969 | Kelm................................. | 219/354 X |
| 3,627,989 | 12/1971 | Heidler ............................. | 219/354 X |
| 3,649,808 | 3/1972 | Gaube............................... | 219/354 UX |
| 3,681,557 | 8/1972 | Suzuki et al. ..................... | 219/10.55 |
| 3,692,968 | 9/1972 | Yasuoka............................ | 219/10.55 |

Primary Examiner—Bruce A. Reynolds
Attorney, Agent, or Firm—Stewart and Kolasch, Ltd.

[57] ABSTRACT

The microwave cooking apparatus disclosed herein is concerned with the use of microwave energy source for the cooking or heating of foodstuffs or other materials and thermal heating means for surface browning thereof. The browning means contains one or more thermal heater elements and a reflecting plate which directs in one direction the heat rays from the elements toward the foodstuffs.

10 Claims, 7 Drawing Figures

MICROWAVE COOKING APPARATUS

BACKGROUND OF THE INVENTION

This invention relates generally to a microwave cooking apparatus, and more particularly to an improved microwave cooking apparatus which provides combination cooking of microwave energy and radiant heat energy.

In general, heat source of the browner means is attained by allowing current to flow through the radiant resistors. Conventional modes of heat conduction are as follows: (A) primary radiation from the heaters. (B) natural convection of the heated atmosphere within the oven compartment and (C) blowing of hot blast against the surface of the foodstuffs or other materials. The latter modes in (B) and (C) suffer from various disadvantages. The temperature with the oven compartment raises at a considerably high one and it is difficult to remove oil or other exhalation stuck to the oven walls. The former mode in (A) is not able to effect a distinct improvement in the browner unit providing that its arrangement is dependent on concept of prior art.

An example of the browner unit utilizing primary radiation is disclosed in German Pat. No. 1,049,019, which unit contains a plurality of pairs of an undirectional spiral heater and a reflector of a concave mirror positioned in the rear of the spiral heater, the pairs being faced with the foodstuffs to be heated. In this case, in order to introduce effectively thermic rays given off from the heater into the foodstuffs, the reflectors shall be of concave shape and the heaters shall be located at the focal points of the corresponding reflectors. Thus, one concave mirror is required for each heater element and further heating efficiency thereof is poor compared with its capability. Furthermore the above-mentioned type is improper because the atomosphere within the oven compartment is heated due to thermic radiation resulting in keeping the whole of the oven at high temperatures.

OBJECTS AND SUMMARY OF THE INVENTION

Accordingly, the primary object of this invention is to provide an improved microwave cooking apparatus which avoids one or more of the disadvantages and limitations of the above conventional apparatus.

Another object of this invention is to provide an improved microwave cooking apparatus which includes a directional browner unit to improve its heat efficiency compared to its heat capacity.

Still another object of this invention is to provide an improved microwave cooking apparatus in which means of exhausting hot atomosphere around the browner unit to cool the whole of the apparatus.

A further object of this invention is to provide a cooking apparatus which have simple mechanical construction for surface browning of the foodstuffs.

It is still a further object of this invention to provide a microwave cooking apparatus in which the browner unit is thoroughly shielded from microwave radiation.

Another object of this invention is to provide an improved microwave cooking apparatus in which the reflecting means made of an electrically conducting material in the browner unit also serve to reflect and diffuse microwaves whereby enlarging the substantial section of microwave radiation to distribute uniformly the microwave energy inside the oven compartment.

In carrying out the solution of the previous problems according to this invention consists essentially in that, in stead of using the browner unit of the above mentioned construction, the brower unit contains one or more thermal heater elements of strip shape each having directional radiation section, and at least one reflecting member of an electrically conducting plate of which reflecting section being faced with the foodstuffs to be heated. In a preferred example, a plurality of resistive heater elements each having a directional radiation outlet and being of strip shape are respectively arranged in a substantially common plane, being electrically isolated from one another except both end portions thereof.

The reflecting plate is positioned at the rear of the resistive heater group to direct in one direction thermic rays from the heater resistors toward the foodstuffs. At the same time the radiation surface of the browner unit is enclosed by an electrically conducting net as well as the conductive reflector to be thoroughly shielded against microwave radiation. If the periphery of the metal reflector is spaced against the oven inner walls at a distance of more than $\lambda/8$ wherein $\lambda$ is the wavelength of microwave energy within the oven, such space serves as an outlet of microwave radiation due to reflection and diffusion of the microwaves by the reflector member.

Further details will be apparent from the following explanation of examples of embodiments of this invention with reference to the accompanying drawings.

DESCRIPTION OF THE PREFERRED EMBODIMENTS

Figure 1:
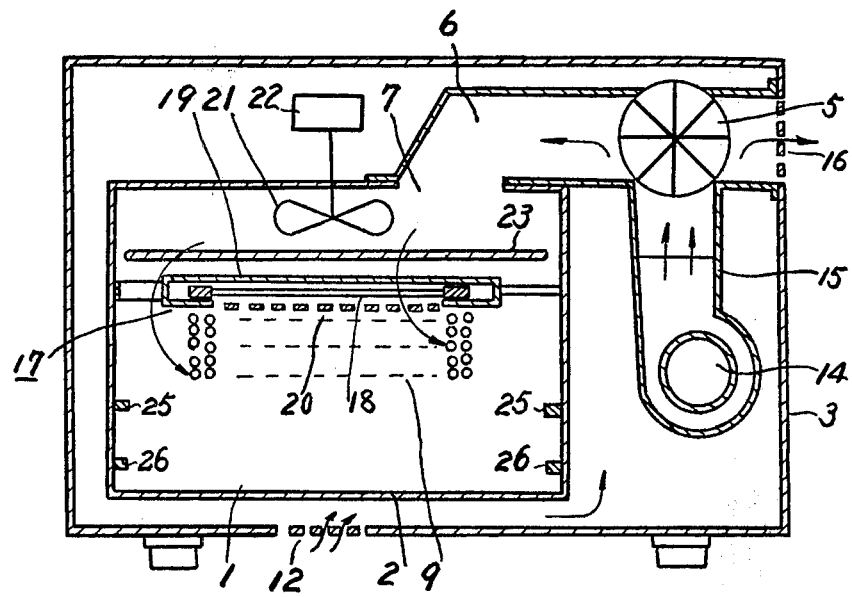
FIG. 1 is a sectional front view showing an oven structure of this invention.
Figure 2:
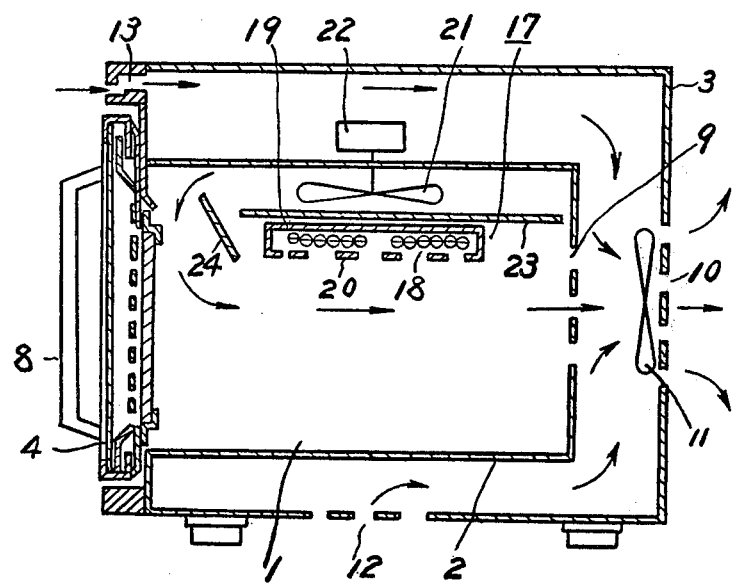
FIG. 2 is a sectional side view showing the oven structure shown in FIG. 1.

Referring now to FIGS. 1 and 2, there is illustrated a microwave cooking apparatus 1 which contain an inner metalic enclosure or oven cavity 2 and an outer casing 3 enclosing the oven cavity 2. In stead of a metalic material, the inner wall 2 may be an electrically insulating material of which the surface is painted with an electrically conducting layer. The passage for air stream is established between the oven cavity 2 and the casing 3 to permit air stream to pass therethrough. A metalic door 4 is pivotally affixed on the front of the oven cavity 2 to freely open and close an access opening thereto, facilitating the entry and withdrawal of the foodstuff into the oven cavity 2. The door 4 is provided at the center thereof with a window permitting visual inspection of the contents of the cavity 2 as well as a handle 8 and the window being covered with an electrically conducting net, of which apertures is of such size as to prevent substantial leakage of microwaves from the cavity 2, as well as glass or the like.

A microwave generator 5 which may comprise a magnetron tube is disposed in the passage for air stream together with a wave guide tube 6 for introducing the microwaves from the generator 5 into the oven cavity 2 through the microwave radiation section 7 extending downward to the cavity 2.

The rear wall of the oven cavity 2 has apertures of such size as to prevent escape of microwave energy therefrom, defining a first exhaust end for the passage of the air stream. The rear wall also is provided with a plurality of apertures of the same size as the above at corresponding positions, the apertures defining a second exhaust end for the passage of the cooling air. Between the first and second exhaust ends 9, 10 there is an exhausting fan 11 secured by a proper supporting member. Moreover, the first and second inhale ends 12, 13 for the passage of the cooling air are formed by a plurality of apertures in the bottom and front of the casing 3 respectively. A blower fan 14 is disposed in the circulation path for the cooling air and mechanically coupled to the magnetron tube 5 by a blower duct 15.

Upon energizing of the blower fan 14 the air moved by the fan blades flows into the passage within the oven through the first inhale end 12, and moves along the blower duct 6 thereby cooling the magnetron tube 5. A part of the air stream is permitted to escape from the exterior of the cavity 2 through a third exhaust end 16 which comprises similarly a plurality of small apertures. On the other hand, most of the surrounding air aspirated from the first and second inhale end 12, 13 cools the exterior of the oven cavity 2 and then is exhausted from the second exhaust end 10 by the fan 11. At this time the cooling air for the magnetron 5 introduced into the cavity 2 also is exhausted from the second exhaust end 10 together with exhalation from the foodstuff.

A browner unit 17 which is an important feature of this invention is secured at the side walls of the oven cavity 2, the radiation surface 18 thereof being arranged to face the foodstuffs or other materials placed in the cavity 2. The browner unit 17 includes a reflector panel 19 disposed in the rear of the heater elements to direct the thermic rays from the heater elements in one direction toward the foodstuff. The thermic radiation section 18 is covered with an electrically conducting net 20 having small apperture of such size shutting off the microwaves. In this case the browner heater is shielded against the microwave by both the electrical conducting reflector 19 and net 20. Otherwise, all the surface of the heater may be thoroughly shielded only by the electrically conducting net.

Moreover, the periphery of the conductive reflector 19 is spaced against the inner walls of the cavity 2 at the distance of more than λ/8 wherein λ is the wave-length of the microwaves in the cavity 2 whereby such space serves as a second radiation outlet of the microwave energy due to reflection and diffusion of the microwaves by the reflector 19. That is to say, the microwaves from the first radiation end 7 are reflected and diffused by the reflector 19 and the oven walls and then introduced into the cavity 2 through the second larger end.

A metalic stirrer fan 21 is rotatably suspended from the upper wall of the cavity 2, the function of which is to spread the microwave energy passing through the wave guide 6 substantially evenly around the periphery of the interior of the cavity 2. The stirrer fan 21 may be driven by a motor 22 or the cooling air for the magnetron 5. A partition wall 23 of a glass plate is inserted between the reflector 19 and the microwave stirrer 21, preventing access of vapor or hot atomosphere to the upper wall and the magnetron 5 through the wave guide 6. The partition wall 23 is made of low loss dielectric material such as glass, through which the microwaves from the radiation section 7 pass toward the reflector 19.

Furthermore, a guide plate 24 made of the same material as the partition plate 23 is provided adjacent the door 4 with an inclinination of a predetermined angle, causing the cooling air for the magnetron 5 to conduct to the inner wall of the door structure. For the reason of increasing the conduction function the partition wall 23 is cut only adjacent the door 4, and the other portion of the partition wall 23 being in contact with the oven cavity walls. The cooling air, therefore passes over the upper end of the guide plate 24 to cool the oven structure and then circulates through the interior of the oven cavity 2, with the result that the air stream is discharged from the first and second exhaust ends 9, 10 by functions of the blower fan 11. Simultaneously, the vapor and the exhalation from the foodstuff are discharged from the exhaust ends 10, 11, preventing raise of the temperature within the oven cavity 2. Both the partition panel 23 and the guide panel 24 are detachably installed in the cavity 2. Within the oven cavity 2 there is provided shelf means on which the foodstuff to be heated can be placed, the shelf being movably supported with the supporting member 25, 26.

In the microwave cooking apparatus mentioned previously the microwaves generated from the magnetron 5 are introduced into the oven cavity 2 to heat the inside of the foodstuff and the panel heater is energized to brown the surface of the foodstuff. The operation period for the energization of the magnetron and the browner unit is individually determined by two manual timers.

Figure 3:
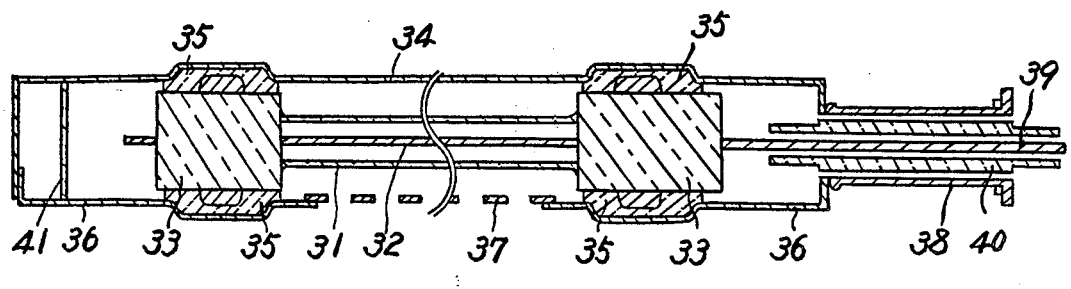
FIG. 3 is an enlarged sectional side view showing the browner unit utilized in the microwave cooking apparatus of this invention.
Figure 4:
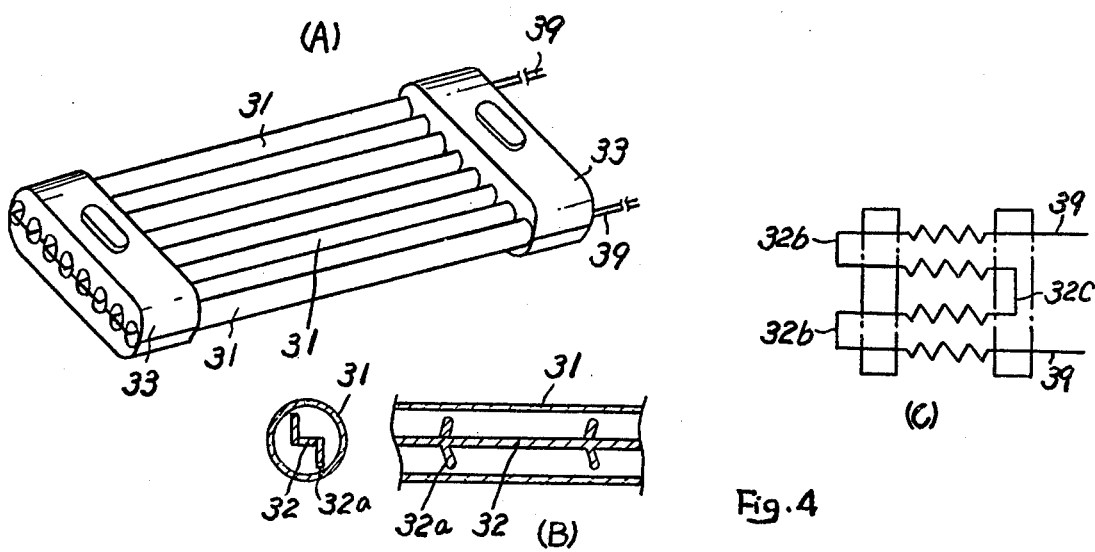
FIGS. 4(A) through 4(C) show respectively a perspective view of the browner unit, a sectional view of the heater elements in the browner means and an electrical connection of the heater elements.
Figure 5:
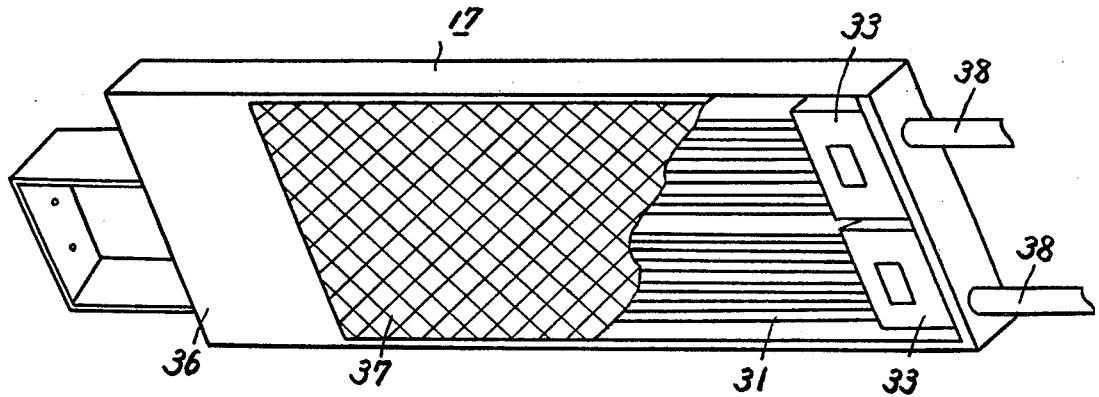
FIG. 5 shows the two block type of the browner unit with the larger thermic radiation area.

The arrangement and construction of the browner unit will be described in more detail with reference to FIGS. 3, 4 and 5.

The pipes 31, 31 are made of heatproof electrically insulating material such as glass, qualtz, etc. having open-ends, through which the thermic rays transmit. The ribbon-like heater element 32 is inserted into the pipe 31. As shown in FIG. 4(A), the infrared browner unit is constructed as the thermic heater source in such a way that a series of such pipes 31, 31 is arranged in a substantially same plane. Further both end portions of the pipes 31, 31 are tightly fixed one with the other by heatproof holders 33, 33. The ribbon-like heater element 32 within the pipe 31 is of resistor type and composed of an alloy material such as Ni-Cr. As disclosed more clearly with reference to FIG. 4(B), each ribbon-like heater element 32 is provided with a plurality of upward and downward projection members 32a, 32a for the reason of preventing the strip shape heater element 32 from contacting directly the inner face of the pipe 31. Even when the ribbon-like heat element 32 is energized by power supply, the projection member 32a itself delivers very little heat except conduction heat, thereby having rare chance of damage thereof. Merits of the projection is remarkable in the case of the glass pipe 31.

As shown in FIG. 4(C), all the ribbon-like heater elements 32, 32 are in series. One end 32b of each heat element 32 is free within the pipe 31 and the other end 32c thereof being affixed within the pipe 31. The formation of the free end 32b is due to linear expansion of the ribbon-like heater element 32.

The browner unit may be constructed either in a single block or a plural block. FIG. 5 shows the two block type of the browner unit with the larger thermic radiation area.

Turning again to FIG. 3 of the drawings, the reflector plate 34 is adhered and affixed to the insulating holder 33 for the heater elements by means of the heatproof material 35 such as ceramic fiber to cover the rear and side of the thermic heater. At least the front surface of the reflector 34 is plane and the rear surface thereof is of an electrically conducting material, as mentioned previously. The reflector cover 36 is attached at one end thereof to the end portion of the reflector plate 34 while the other end being adhered to the insulating holder 33 by the ceramic fiber 35.

A metalic net 37 is disposed in front of the thermic heater and is such constructed as to cut off the microwaves and to transmit the thermic rays from the browner unit. The reflector plate 34, the reflector cover 36 and the metalic net 37 serve cooperatively as shielf means of the thermic heater against the microwave energy.

The reflector plate 34 and the reflector cover 36 have at one side therof an opening around which the metal pipe 38 is attached. Two heated leads 39, 39 are held within the metal pipes 38, 38 for the reasons of supplying power to each ribbon-like heater 32. Moreover, the heater leads 39, 39 are inserted into the ceramic pipes 40, 40. The other end of the metal pipe 38 is affixed to the inner wall of the cavity 2 to lead out the ceramic pipes 40, 40 toward the exterior of the oven cavity 2. In installing the browner unit the metal pipes 38, 38 serve as supporting members therefor. Between the free end 32b of the ribbon-like heater element and the side wall of the browner there is provided an insulating plate 41 to prevent the thermically expanded free end 32b of the heater element from contacting the reflector structure.

It should be noted that the heating element within the browner unit is of such strip-like or ribbon-like shape that the thermic radiation thereof is directional with results of improvements in the browning operation compared to the prior art spiral heating element. In addition, the reflecting plate directs the heat rays from the ribbon-like heating elements in one direction toward the foodstuff. The reflecting plate of an electrically conducting material also has effects of spreading and diffusing the microwaves from the microwave generator.

Figure 6:
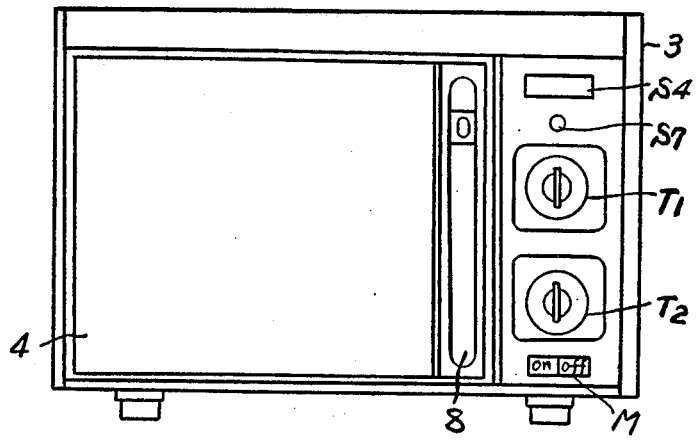
FIG. 6 is a front view of the microwave cooking apparatus.

Although the microwave heating and the infrared thermic heating may be simultaneously carried out, either heting is, in fact, individually carried out because of limitations of power capacity. The operation periods for the magnetron and browner are manually set by two timers on the front panel of the casing 3. In FIG. 6 there are provided the first timer T1 for the browner, the second timer T2 for the magnetron, the power switch M, the cooking start switch S4 and the switch S7 for determing the order of priority for two timers on the front panel of the microwave cooking apparatus.

Figure 7:
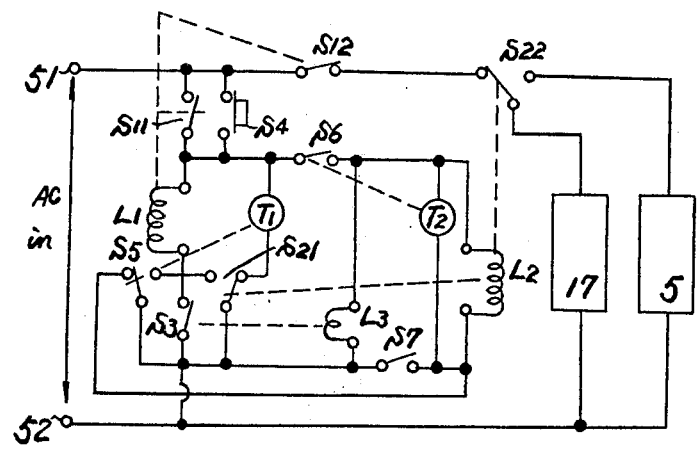
FIG. 7 is a circuit diagram for alternatively switching the browner radiation and microwave radiation.

The manner in which the microwave heating and browner heating is taken out for the predetermined periods will be evident from the schematic diagram of FIG. 7. As there shown, the power terminals 51, 52 are electrically connected to an A.C. power source. One terminal 51 connects contacts S11, S12 of the cooking relay L1 and one end of the cooking switch S4. A parallel circuit of the contact S11 and the cooking switch S4 is connected to the energizing coil of the relay L1 and one end of the first timer T1 for the browner and further the relay L2 through the contact S6 of the second timer T2 for the magnetron, and a parallel circuit of the second timer T2 and an auxiliary relay L3. The other ends of the timer T2 and the relay L2 are connected through the priority switch S7 to the other terminal 52. The contact S12 is connected to either the browner 17 or the magnetron power supply circuit 5' through the movable contact S22.

First of all, when only the second timer T2 is set and the cooking switch S4 is closed, the relays L2 and L3 is activated upon closing the contact S6, causing the relay L1 to be energized by the following switch operation of the contact S22. As a result the power is supplied to the magnetron circuit 5' to carry out the microwave heating for the predetermined period.

Upon the open condition of the contact S6 of the timer T2 the relays L2 and L3 are deenergized to reset the contacts S11, S12 of the relay L1. At this time when setting only the browner timer T1 the contacts S11, S12 are opened due to depression of the cooking switch S4, whereby thermic heater 4 becomes operative to carry out the browner heating.

In the case where both timers T1, T2 are manually set and the priority switch S7 is in the open condition as show in this drawing, the contacts S5 and S6 are closed and upon depression of the cooking switch S4 the contacts S11, S12 are turned to the closed positions, causing the browner 17 to be energized prior to the microwave heating through the contact S22. Thereafter, when the browner timer T1 returns back to the zero position, current flows through the timer T2 and the relay L2 to switch the contact S23 to the magnetron side. In consequence of the switching operation the microwaves are radiated from the magnetron 5 for the set period.

Contrarily, in the case where the priority switch S7 is in the closed position, the microwave heating is carried out prior to the browner heating.

Although the description of this invention has been made with a certain degree of particularity, it is understood that the present disclosure has been made only by way of example and that numerous changes in the details of construction and the combination and arrangement of the parts and elements may be resorted to without departing from the spirit and scope of this invention.

I claim:

1. A microwave cooking apparatus comprising an oven chamber having an access opening adapted to receive an article to be cooked and having an electrically conductive inner wall, a door fitted to the chamber to open and close the access opening, microwave generator means communicating with the interior of said oven chamber for supplying microwave energy thereto, thermic ray radiation type unidirectional browning means for browning the surface of the article by means of the thermic rays emanating therefrom, said browning means including a plurality of resistive heating elements for generating thermic rays toward said article, said heating elements being arranged in a single layer construction and having a thermic ray-reflecting continuous panel closely associated therewith, each of said resistive heating elements being of the strip type having two directionally opposed thermic ray radiation surfaces which provide two broad heating surfaces relative to the thickness of said heating element, one of said surfaces facing the article for direct application of the thermic rays therefrom to said article, said other surface facing the reflecting panel without any elements being disposed therebetween, thereby directing the thermic rays from said other surfaces in the same direction as that of said direct application of thermic rays, said surface of the browning means which faces the article being provided with an electrically conductive net so that the thermic ray radiation type unidirectional browning means is substantially housed by the thermic ray reflecting panel at one surface and by said electrically conductive net at the other surface, said ray reflecting panel being disposed between the microwave generator means and the one surface of said ray reflecting browning means and said electrically conductive net being disposed between the other surface of said ray reflecting browning means and the article to be cooked, means for supplying power to the thermic ray radiation type browner means, and a solid partition wall extending a substantial distance across the oven chamber and disposed between the microwave generator and the reflecting panel, said partition preventing ready access of vapor or hot atmosphere to the upper wall of the oven chamber and to the microwave generator.

2. The microwave cooking apparatus of claim 1, wherein fan means are disposed between the microwave generator and the partition wall for circulating the microwave energy uniformly around the periphery of the oven chamber.

3. The microwave cooking apparatus of claim 2, wherein the oven chamber is disposed in an outer casing, the walls of said outer casing and said oven chamber defining a channel therebetween, and fan means are disposed in said channel defined by the walls of said outer casing and said oven chamber for exhausting air from the oven chamber and said channel to the atmosphere.

4. The microwave cooking apparatus of claim 1, wherein the periphery of the ray-reflecting continuous panel is spaced apart from the inner wall of the oven cavity at a distance of $\lambda/8$ wherein $\lambda$ is the wave-length of the microwaves within the oven chamber.

5. The microwave cooking apparatus of claim 1, wherein shelf means are disposed within the oven chamber for holding the article to be cooked, said shelf means being provided with additional means for adjusting the distance between said shelf means and the browning means.

6. The microwave cooking apparatus of claim 1, wherein the resistive heating elements are ribbon-like elements disposed in pipe-like elements made of a heat-proof, electrically insulating material, both ends of said pipe-like means being fixed to the inner wall of the chamber by means of a heat proof material.

7. The microwave cooking apparatus of claim 6, wherein the heating element contains a plurality of upwardly extending and downwardly extending projections which prevent a substantial portion of the heating element from contacting the inner wall of the pipe-like insulating material.

8. The microwave cooking apparatus of claim 6, wherein power is supplied to the browner means through electrical leads disposed within the pipe-like element.

9. The microwave cooking apparatus of claim 6, wherein the heating element is provided with one free end whereby the linear expansion of the heating element is readily absorbed.

10. The microwave cooking apparatus of claim 1, which further comprises means for introducing cooling air into the space between the oven wall and the partition wall, means for conducting the introduced cooling air to the door to cool the door structure and means for exhausting the cooling air from the interior of the oven chamber.

* * * * *